United States Patent
Sugiura

(10) Patent No.: US 8,333,833 B2
(45) Date of Patent: Dec. 18, 2012

(54) LOW THERMAL EXPANSION FILLER, METHOD FOR PREPARING THE SAME AND GLASS COMPOSITION

(75) Inventor: Koji Sugiura, Naogya (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 13/320,505

(22) PCT Filed: May 14, 2010

(86) PCT No.: PCT/JP2010/058156
§ 371 (c)(1),
(2), (4) Date: Nov. 14, 2011

(87) PCT Pub. No.: WO2010/131731
PCT Pub. Date: Nov. 18, 2010

(65) Prior Publication Data
US 2012/0058877 A1    Mar. 8, 2012

(30) Foreign Application Priority Data
May 15, 2009 (JP) ................. 2009-118353

(51) Int. Cl.
*C01B 25/45* (2006.01)
*C03C 8/24* (2006.01)
*C04B 35/447* (2006.01)

(52) U.S. Cl. ............. 106/450; 106/286.2; 106/462

(58) Field of Classification Search ............ 106/450, 106/462, 286.2; 501/17
See application file for complete search history.

(56) References Cited

U.S. PATENT DOCUMENTS

| | | | | |
|---|---|---|---|---|
| 4,112,194 A | * | 9/1978 | Chenot et al. | ........... 428/690 |
| 7,771,738 B2 | * | 8/2010 | Sugiura et al. | ........... 424/405 |
| 8,097,263 B2 | * | 1/2012 | Sugiura et al. | ........... 424/400 |
| 8,110,205 B2 | * | 2/2012 | Sugiura | ........... 424/400 |
| 2010/0267544 A1 | | 10/2010 | Sugiura | |
| 2012/0064131 A1 | * | 3/2012 | Sugiura | ........... 424/400 |

FOREIGN PATENT DOCUMENTS

| | | |
|---|---|---|
| JP | 2-267137 A | 10/1990 |
| JP | 3-83905 A | 4/1991 |
| JP | 5-17112 A | 1/1993 |
| JP | 2000-290007 A | 10/2000 |
| JP | 2004-224630 A | 8/2004 |
| JP | 2006-111463 A | 4/2006 |
| JP | 2007-302532 A | 11/2007 |
| WO | WO 2009/063891 A1 | 5/2009 |

OTHER PUBLICATIONS

International Search Report for PCT/JP2010/058156 dated Jul. 27, 2010.
Ota et al., "Low-Thermal-Expansion $KZr_2(PO_4)_3$ Ceramic", Journal of the Ceramic Association, 1987, vol. 95, No. 5, pp. 531-537.

* cited by examiner

*Primary Examiner* — Anthony J Green
(74) *Attorney, Agent, or Firm* — Birch, Stewart, Kolasch & Birch, LLP

(57) ABSTRACT

An object of the present invention is to provide a low thermal expansion filler for low thermal expansion glasses which has a low coefficient of thermal expansion and exhibits superior flowability in a molten state, and a glass composition containing the same.
It has been found that a low thermal expansion filler composed of a hexagonal zirconium phosphate powder where a specific particle size of 0.8 μm to 50 μm is 95% or more on a volume basis has excellent low thermal expansion property and excellent flowability, and a glass composition containing the filler has been accomplished.

7 Claims, 3 Drawing Sheets

LOW THERMAL EXPANSION FILLER, METHOD FOR PREPARING THE SAME AND GLASS COMPOSITION

TECHNICAL FIELD

The present invention relates to a low thermal expansion filler containing a hexagonal zirconium phosphate powder wherein the particle size is controlled, a method for preparing the same and a glass composition containing the same. The low thermal expansion filler of the present invention may be used as an additive which exhibits a low thermal expansion property when mixed with glass materials requiring control of thermal expansion property, and the glass composition containing the filler may be used for a sealing application for a plasma display (PDP), a fluorescent display tube, a LSI package and the like.

RELATED ART

Zirconium phosphates include amorphous zirconium phosphates and crystalline zirconium phosphates including a 2-dimensional layered structure or a 3-dimensional network structure. Among them, a hexagonal zirconium phosphate having a 3-dimensional network structure has excellent superior heat resistance, chemical resistance, radiation resistance and low thermal expansion properties and the like and are thus being researched for use as immobilizing for radioactive waste, a solid electrolyte, a gas adsorbing and separating agent, a catalyst, an antimicrobial agent raw material, and a low thermal expansion filler and the like.

Various hexagonal zirconium phosphates have been known as low thermal expansion powders. For example, $NaZr_2(PO_4)_3$, $CaZr_4(PO_4)_6$, $KZr_2(PO_4)_3$ and the like are disclosed in Patent Document 1 and Non-Patent Document 1.

Known methods for synthesizing zirconium phosphates include a calcination method in which synthesis is carried out by mixing raw materials in a dry manner and then calcining the mixture at 1,000° C. or higher using a calcining furnace (for example, see Patent Document 2 and Patent Document 4), a hydrothermal method in which synthesis is carried out by mixing raw materials in water or mixing raw materials containing water and then heating under pressure, and a wet method in which synthesis is carried out by mixing raw materials in water and then heating at normal pressure (for example, see Patent Document 3), etc.

Among these synthesis methods, in the calcination method, it is not easy to uniformly mix raw materials and it is thus difficult to obtain zirconium phosphate with a homogeneous composition. In addition, since crystallization by calcination causes the formation of agglomerated materials by sintering, it is necessary to grind these materials to make them into a powder with a specific particle size. However, since zirconium phosphates having superior crystallinity have high hardness, abrasion of a pulverizing apparatus or contamination by abraded materials readily occurs, and the shape or particle size of the pulverized crystals may not be controlled. Accordingly, the method for preparing particles having a particle size distribution with a narrow range disclosed in the present invention has been hitherto unknown.

When a glass composition contains zirconium phosphates having a large particle size, in some cases, strength of the glass is weak and is unsuitable for application to fine processing. Meanwhile, when the particle size is excessively small, it is difficult to exert a low thermal expansion property and flowability is deteriorated when the glass is melted. In particular, as the particle size of particles decreases, the particles have greater effects on deterioration in flowability, thus pulverized products having a wide particle size distribution have a disadvantage in that the dissolution flowability of glass composition is low due to fine particulate components contained therein.

In addition, when zirconium phosphates prepared by a calcination method are used as low thermal expansion fillers, it is necessary to densify the zirconium phosphates to prevent generation of microcracks and improve reduction of pores and thermal stability and addition of a sintering agent such as MgO is inevitable (for example, Non-Patent Document 1). However, an impurity such as a sintering agent causes corrosion when melted with the glass, thus causing a concern that sufficient thermal expansion may be impossible. Thus, basically, production efficiency was not improved.

Meanwhile, with the wet method or hydrothermal method, it is easy to obtain a uniform zirconium phosphate powder, as disclosed in Patent Document 3. However, with the wet method or hydrothermal method, it is technically difficult to obtain only a crystalline powder having a particle size larger than 1 μm to exhibit high flowability, since inherent particulates are readily produced.

PRIOR ART DOCUMENTS

Patent Documents

Patent Document 1: JP-A-02-267137 (JP-A denotes a Japanese unexamined patent application publication)
Patent Document 2: JP-A-2000-290007
Patent Document 3: JP-A-05-017112
Patent Document 4: JP-A-03-83905

Non-Patent Documents

Non-Patent Document 1: Shigetaka Oota, Iwao Yamai, "Preparation of low-thermal expanded $KZr_2(PO_4)_3$ ceramic" Journal of the Ceramic Association, 1987, Vol. 95, No. 5, p 531 to 537.

DISCLOSURE OF INVENTION

Problems to be Solved by the Invention

An object of the present invention is to provide a low thermal expansion filler which exhibits a low thermal expansion property when mixed with a glass and does not impair flowability when the glass is in a molten state, and a glass composition containing the filler.

Means for Solving the Problems

As a result of an intensive investigation to solve the problems, the present inventors developed a low thermal expansion filler composed of hexagonal zirconium phosphates having a specific particle size distribution in which particles with a particle size of 0.8 μm to 50 μm are 95% or more on a volume basis and having superior crystallinity in accordance with a preparation method using zirconium carbonate as a raw material. In addition, the present inventors discovered that a glass composition containing the filler has excellent flowability in a molten state and a low thermal expansion property. The glass composition is completed based on this discovery.

EXPLANATION OF REFERENCE NUMERALS AND SYMBOLS

Figure 1:
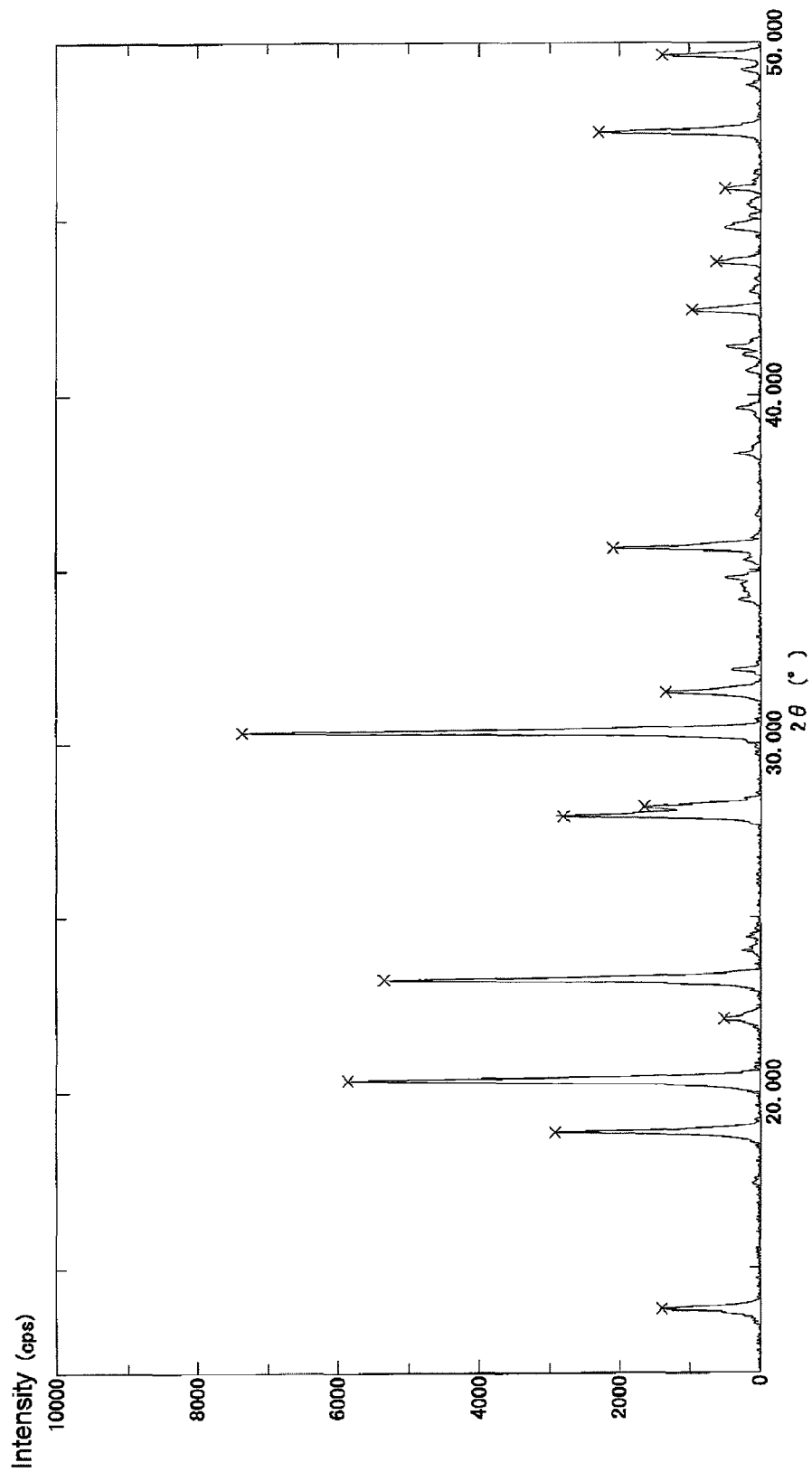
FIG. 1 is an X-ray diffraction chart which measures hexagonal zirconium phosphate obtained in Example 1 using a powder X-ray diffraction apparatus.
Figure 2:
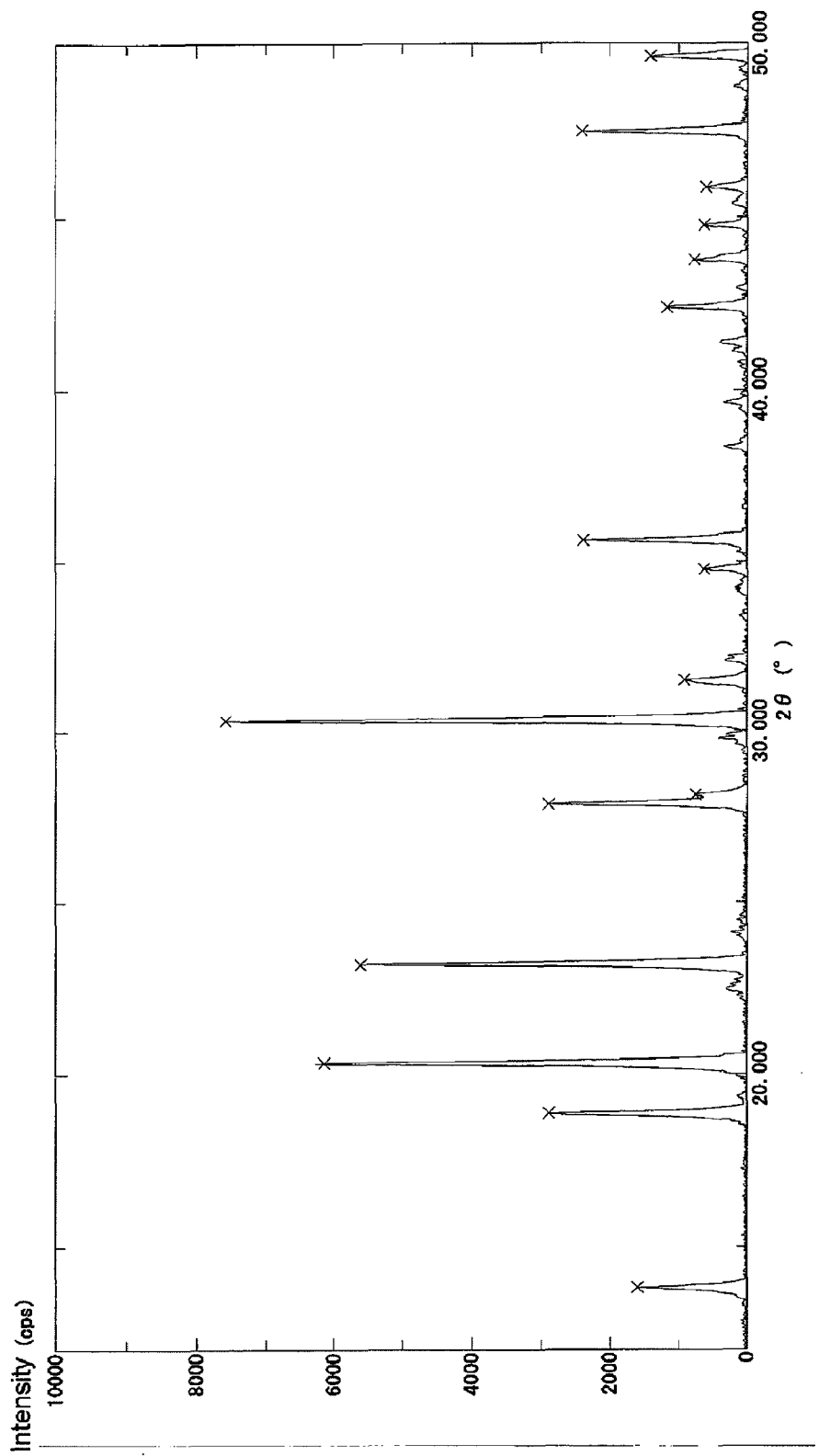
FIG. 2 is an X-ray diffraction chart which measures hexagonal zirconium phosphate obtained in Example 4 using a powder X-ray diffraction apparatus.
Figure 3:
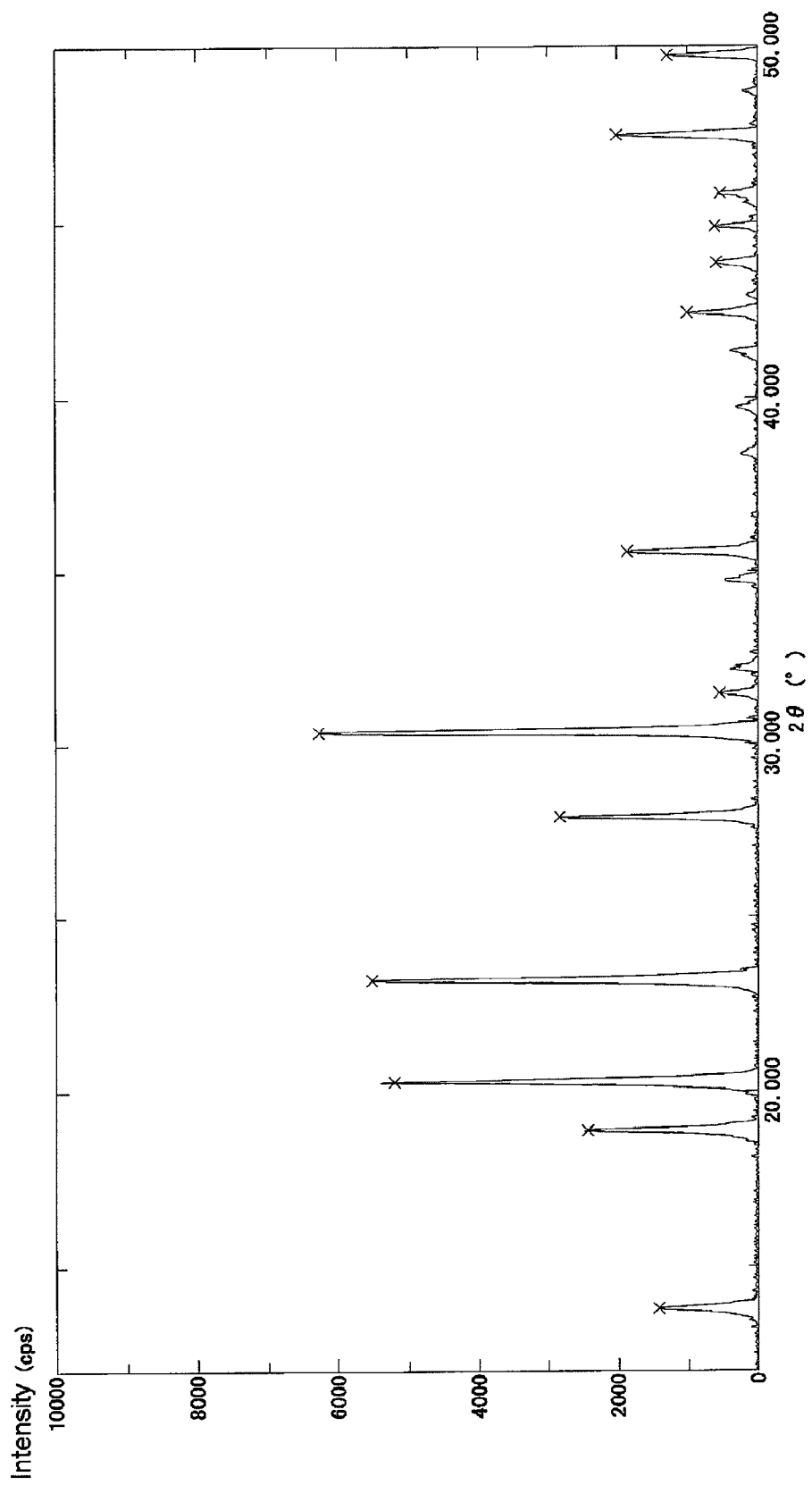
FIG. 3 is an X-ray diffraction chart which measures hexagonal zirconium phosphate obtained in Comparative Example 2 using a powder X-ray diffraction apparatus.

In FIGS. 1 to 3, the vertical axis represents an X-ray intensity (unit: cps) during X-ray diffraction measurement.

In FIGS. 1 to 3, the horizontal axis represents a diffraction angle 2θ of an X-ray (unit:°).

BEST MODE FOR CARRYING OUT THE INVENTION

Hereinafter, the present invention will be described. In addition, "%" means % by weight, unless otherwise defined. In addition, the term "thermal expansion (property)" means a concept well-known as a coefficient of thermal expansion (CTE) associated with a phenomenon in which as temperature increases, the length or volume of a substance increases. The term "thermal expansion property" uses a concept well-known as the value of the length according to the present invention, that is, linear expansibility or linear expansion coefficient, although the value of the thermal expansion property differs from that of the length or volume. The term "low thermal expansion property" means a great or small level of reduction effects of intrinsic thermal expansion property of the corresponding material which can be obtained by using the low thermal expansion filler. For example, as a linear expansibility of a glass composition prepared by mixing a predetermined amount of low thermal expansion filler with a glass powder is smaller than that of an original glass, the low thermal expansion property of the low thermal expansion filler is excellent.

The low thermal expansion filler of the present invention contains a hexagonal zirconium phosphate powder represented by Formula (1) below, wherein a particle size of 0.8 μm to 50 μm is 95% or more on a volume basis with respect to the total particles.

$$M_aZr_bHf_c(PO_4)_3 \cdot nH_2O \quad (1)$$

(In Formula (1), M represents at least one ion selected from an alkali metal ion, an alkaline earth metal ion, an ammonium ion and a hydrogen ion; a, b and c are values satisfying 1.75<b+c<2.25, and a+4(b+c)=9 in a case where M is monovalent, 2a+4(b+c)=9 in a case where M is divalent; a and b are a positive number, c is zero or a positive number, and n is zero or a positive number of 2 or less.)

In a case where M is present as a mixture of the monovalent and the divalent, a coefficient is suitably applied to a depending on a ratio of the monovalent M and the divalent M. For example, when a molar ratio of the monovalent M and the divalent M is 40/60, a in the equation of a+4(b+c)=9 may be substituted by (40/100+2×(60/100)) a.

The low thermal expansion filler of the present invention can be obtained by a preparation method including dispersing a zirconium carbonate powder in an aqueous solution containing at least one ion selected from an alkali metal ion, an alkaline earth metal ion and an ammonium ion, and a phosphate ion, wet-aging the dispersion and subsequently dry-heating the dispersion.

A preferred value of a in Formula (1) is varied in cases of an alkali metal ion, an ammonium ion or a hydrogen ion and an alkaline earth metal ion.

a which is present only in a case of an alkali metal ion, an ammonium ion or a hydrogen ion is a positive number lower than 2, is preferably 0.7 to 1.2, and is more preferably 0.75 to 1.0. Meanwhile, a which is present only in a case of an alkaline earth metal ion is a positive number lower than 1, is preferably 0.35 to 0.6, and is more preferably 0.4 to 0.5.

In Formula (1), b and c are values satisfying 1.75<b+c<2.25, a+4(b+c)=9. b is higher than 1.75 and is equal to or lower than 2.1 and a preferred range thereof is 1.9 to 2.1. In addition, c is preferably 0.2 or less, is more preferably 0.01 to 0.2, and is yet more preferably 0.015 to 0.15.

In Formula (1), n is preferably 1 or less, is more preferably 0.01 to 0.5, and yet more preferably 0.03 to 0.3. When n is higher than 2, the absolute amount of moisture contained in the low thermal expansion filler of the present invention is high and there is a concern that foaming, hydrolysis or the like occurs, when mixed with a variety of materials and heated.

Regarding the particle size distribution of the zirconium carbonate powder that may be used as a material for synthesizing the low thermal expansion filler of the present invention, particles having a particle size of 0.5 μm to 50 μm are 95% or more on a volume basis with respect to the total particles, particles having a particle size of 0.6 μm to 50 μm are more preferably 95% or more on a volume basis, and particles having a particle size of 0.7 μm to 45 μm are preferably 95% or more on a volume basis, with respect to the total particles. The measurement of particle size may be suitably carried out using any one of a laser diffraction particle size distribution meter or a centrifugal sedimentation particle size distribution meter, Coulter counter, a counting method by an electron microscope or the like. Among them, a laser diffraction particle size distribution meter is particularly preferred and a dispersion of a powder in water to an organic solvent is preferably measured in order to avoid effects of aggregation.

The zirconium carbonate powder used for the present invention is represented by Formula (2) and is preferably poorly water soluble or water insoluble.

$$eZrO_2 \cdot CO_2 \cdot fH_2O \quad (2)$$

In Formula (2), e and f are a positive numbers, and, more specifically, e is preferably 0.2 to 5, is more preferably selected from 0.5, 2 and 3 from the viewpoint of obtaining a stable compound, and is particularly preferably 3. f is preferably 8 to 25 from a viewpoint of obtaining a stable compound, and is more preferably 15 to 20.

Specific examples of zirconium carbonates include $3ZrO_2 \cdot CO_2 \cdot xH_2O$ called "zirconium basic carbonate" or "zirconium basic carbonate hydrate" or the like. $ZrO_2 \cdot 2CO_2 \cdot xH_2O$ called "zirconium dicarbonate", and $2ZrO_2 \cdot CO_2 \cdot xH_2O$ called "zirconium carbonate hydroxide oxide", "zirconium basic carbonate" or "zirconium oxycarbonate". In addition, double salts containing ammonium, sodium and potassium and the like may be used. Among them, zirconium carbonate ammonium, as an example of a double salt, is used for paper application and is thus industrially easily available. However, it is difficult to disperse zirconium carbonate ammonium with a particle size in an aqueous solution since it is water-soluble. Preferred zirconium carbonates among zirconium carbonates represented by Formula (2) in the present invention are $ZrO_2 \cdot 2CO_2 \cdot xH_2O$ wherein e is 0.5, $2ZrO_2 \cdot CO_2 \cdot xH_2O$ wherein e is 2, and $3ZrO_2 \cdot CO_2 \cdot xH_2O$ wherein e is 3. In addition, the zirconium carbonate of the present invention preferably contains hafnium. The amount of hafnium may be varied according to metallurgic technologies, but the mass of hafnium is preferably 0.2% by mass to 5% by mass based on the total mass of the zirconium carbonate powder from viewpoints of high reactivity and superior economical efficiency.

In addition, zirconium carbonate may be commercially available, but is preferably a synthetic product to control a particle size. A material for synthesizing zirconium carbonate is preferably zirconium oxide sulfate or zirconium oxychloride. The zirconium sulfate oxide can be, for example, obtained by reacting 1 mole of sodium carbonate and 0.4 moles of sodium hydrogen carbonate in an aqueous sodium chloride solution, with respect to 2 moles of zirconium oxide sulfate. Meanwhile, zirconium oxychloride can be, for example, obtained by reacting 1 mole of sodium carbonate and 2 moles of sodium hydrogen carbonate in an aqueous sodium chloride solution with respect to 2 moles of zirconium oxychloride.

An aqueous solution used for dispersing zirconium carbonate in the present invention is an aqueous solution containing at least one ion selected from an alkali metal ion, an alkaline earth metal ion and an ammonium ion, and a phosphate ion.

Examples of the alkali metal ion useful as a material for synthesizing the low thermal expansion filler of the present invention include ions such as lithium, sodium, potassium, rubidium and cesium. Compounds containing these metal ions are necessarily water-soluble and useful examples thereof include chlorides, hydroxides, nitrates, sulfates, carbonates and the like. Hydroxide is preferred in that it is highly alkaline and provides good efficiency in increasing pH of an aqueous solution. Preferred alkali metal ions include sodium ions and potassium ions and preferred compounds include sodium hydroxide and potassium hydroxide. In addition, examples of the alkaline earth metal ions used in the present invention include ions such as magnesium, calcium, strontium and barium. Preferred is a magnesium ion or calcium ion. In addition, if necessary, such as for application, other transition metal ions may also be suitably added thereto.

A molar ratio of an alkali metal ion, an alkaline earth metal ion and an ammonium ion, and zirconium carbonate when synthesizing the low thermal expansion filler of the present invention is preferably equal to or higher than 0.3 and is lower than 0.9, more preferably equal to or higher than 0.35 and is lower than 0.85, yet more preferably equal to or higher than 0.4 and is equal to or lower than 0.8 (assuming that the zirconium carbonate compound is 1).

A phosphate ion source that may be used as a material for synthesizing the low thermal expansion filler of the present invention may be any one which is ionized in water to produce a phosphate ion. Specifically, examples of the phosphate ion source include phosphoric acid, sodium phosphate, potassium phosphate, ammonium phosphate, metaphosphoric acid, polyphosphoric acid, and phosphorus pentoxide. More preferred are an alkali metal salt, an alkaline earth metal salt and an ammonium salt of phosphoric acid, or phosphoric acid, and yet more preferred is phosphoric acid. In addition, the concentration of phosphoric acid is preferably about 60% by weight to about 85% by weight, when it is used as a raw material. A phosphate ion is produced in an aqueous solution although any phosphorous compound is used.

Phosphoric acid has a low ionization degree and all phosphoric acid present in an aqueous solution is not present as a phosphate ion and ionization equilibrium is thus formed between a phosphate ion source and a phosphate ion. In addition, hydrogen phosphate ions or dihydrogen phosphate ions are simultaneously formed in an equilibrium state, and the content ratio thereof varies depending on the pH of the aqueous solution. When the phosphate ion source described above is present in water, phosphate ions are necessarily produced, and an aqueous solution containing a phosphate ion source is thus the same as an aqueous solution containing a phosphate ion.

The concentration of the zirconium carbonate powder dispersed in water or an aqueous solution is not particularly limited as long as a uniform dispersion is possible. When the concentration is low, viscosity decreases and thus mixing with stirring is easy. Meanwhile, in a case of high concentration, productivity per volume increases. Accordingly, the concentration is preferably 5 to 40% by weight, and more preferably 10 to 30% by weight. A molar ratio of phosphoric acid and zirconium carbonate (assuming that the zirconium compound is 1) is preferably 1.1 to 1.7, more preferably 1.2 to 1.6, and yet more preferably 1.25 to 1.5, from a viewpoint of obtaining superior crystallinity.

The low thermal expansion filler with a preferred particle size distribution can be obtained by dispersing zirconium carbonate in an aqueous solution satisfying these conditions, and aging the aqueous dispersion while heating, preferably calcining, the same. Zirconium carbonate enables easy control of particle size. Accordingly, obtaining hexagonal zirconium phosphate crystals with a preferred particle size distribution using zirconium carbonate having a coarse particle size distribution of about 5 to 50 μm as a raw material, while limiting preparation conditions such that the particle size thereof does not greatly vary during reaction with phosphoric acid is a technical point to prepare a low thermal expansion filler of the present invention.

A method for dispersing a zirconium carbonate powder in water or in an aqueous solution is not limited and examples thereof include adding a zirconium carbonate powder to an aqueous solution containing at least one ion selected from an alkali metal ion, an alkaline earth metal ion and an ammonium ion, and a phosphate ion, adding an aqueous solution containing at least one ion selected from an alkali metal ion, an alkaline earth metal ion and an ammonium ion, and a phosphate ion to water in which a zirconium carbonate powder is dispersed, and adding, to water in which a zirconium carbonate powder is dispersed, a compound serving as an ion source thereof and the like.

After mixing raw materials, the raw materials are preferably heated while stirring such that they are uniformly mixed and the reaction is uniformly performed. This process is referred to as "heat-aging". A heat-aging time is not limited. However, as the heat-aging time is short, production efficiency increases. The heat-aging time is preferably 10 minutes to 24 hours, and is more preferably one hour to 10 hours.

The heat-aging temperature is preferably 40° C. or higher, more preferably 60° C. or higher, yet more preferably 70° C. or higher, and most preferably 80° C. or higher. As the aging temperature is increased to a high temperature to 40° C. or higher, it is easy to obtain a hexagonal zirconium phosphate powder with superior crystallinity and the aging time is shortened. The upper limit of the aging temperature is 100° C. at normal pressure, but may be higher than 100° C. when pressurized. However, when the process is performed at an excessively high temperature and at an excessively high pressure, equipment costs are involved. Accordingly, a preferred upper limit is 200° C.

After heat-aging, the hexagonal zirconium phosphate may be separated by filtration, washed with deionized water and then dry-heated. Washing is to remove unnecessary attached components using a solvent. Specifically, washing is carried out by dipping the hexagonal zirconium phosphate in deionized water, or flowing water to remove remaining water-soluble components to prevent discoloration or loss transparency when used as a low thermal expansion filler. An industrially preferred washing method is washing by filtering using a ceramic filter and crossflow washing is preferred. A washing degree can be evaluated by monitoring an electrical conductivity with a filtrate. It is preferably that washing is performed until an electrical conductivity of the filtrate reaches 500 μS (Siemens) or less, in view of sufficiently removing impurities.

Although dry-heating generally means treatment conditions where water or a solvent is not present, in the present invention, the term means environments to evaporate moisture and heating a powder in a dry state. A maximum heating temperature is 650° C. to 1500° C., is preferably 700° C. to 1450° C., and is more preferably 800° C. to 1400° C. In addition, a heating time is not limited as long as it contains a temperature elevation time, but is preferably 1 hour or 24 hours, more preferably 2 to 18 hours, and is yet more preferably 4 hours to 15 hours. In general high-temperature processing apparatuses, unevenness by temperature is inevitable and the present invention can be accomplished although a difference of ±100° C. or 50° C. is present between a predetermined maximum temperature and an actual powder temperature. Measurement of temperature may be performed using a measurement apparatus such as a thermocouple equipped with a heater as well as temperature indicators such as firing degree measuring chips.

A temperature elevating rate which reaches a maximum temperate is preferably 0.1° C./min to 50° C./min. Before the maximum dry-heating temperature, a drying process in which moisture is evaporated at a temperature of 600° C. or less may be further performed to facilitate drying under reduced pressure.

The dry-heating process may be carried out by using any general heating method such as a Rotary kiln, an electric furnace or a gas furnace and heating may be performed while agitating or stirring to prevent formation of a skin layer on the surface. After heating, the powder is slightly pulverized to obtain a hexagonal zirconium phosphate powder with highly pure white crystals. The preparation method is superior in that there is almost no necessity for pulverizing and screening, since the diameter of primary particles can be controlled and sintering does not easily occur.

Regarding the particle size of the low thermal expansion filler of the present invention, particles with a particle size of 0.8 μm to 50 μm are preferably 95% or more on a volume basis, particles with a particle size of 0.8 μm to 45 μm are more preferably 95% or more on a volume basis, and particles with a particle size of 0.9 μm or more and 40 μm are yet more preferably 95% or more on a volume basis. In addition, a median particle size on a volume basis is preferably 1 to 40 μm and more preferably 2 to 35 μm.

The low thermal expansion filler of the present invention preferably has as a small specific surface area as possible. The specific surface area is affected by the particle size. When a median diameter of the low thermal expansion filler of the present invention is several micrometers (μm), the median diameter is preferably 2 cm²/g or less, and when the median diameter exceeds 10 micrometers (μm), it is preferably 1 cm²/g or less.

The low thermal expansion filler of the present invention preferably has as a high thermal conductivity as possible. Generally, the thermal conductivity of powders cannot be easily measured and may be measured using a needle probe method or the like. The low thermal expansion filler of the present invention preferably has a thermal conductivity of 0.1 λ/Wm⁻¹ K⁻¹ μm or more.

The low thermal expansion filler of the present invention is highly crystalline hexagonal zirconium phosphate. The crystallinity of hexagonal zirconium phosphate may be evaluated by peak intensity derived from hexagonal zirconium phosphate crystals by powder X-ray diffraction. When measured under conditions of X-rays of 50 kv/120 mA by a powder X-ray diffraction apparatus with CuKα rays, the peak intensity at about 2θ=20.2° which is the peak derived from the detected hexagonal zirconium phosphates is 1,500 cps or more, is preferably 2,000 cps or more, and is more preferably 2,500 cps or more. When the peak intensity is 1,500 cps or less, sufficient crystallinity cannot be obtained and there is a concern that the low thermal expansion property may be deteriorated.

The low thermal expansion filler of the present invention is highly pure hexagonal zirconium phosphate. The purity of hexagonal zirconium phosphate may be measured by confirming the presence of impurity peaks other than peaks derived from hexagonal zirconium phosphate crystals by powder X-ray diffraction and amounts of constituents contained therein by fluorescent X-ray analysis. A total of the constituents derived from hexagonal zirconium phosphate detected by fluorescent X-ray analysis is preferably 96% or more, and is more preferably 99% or more.

Examples of the composition of hexagonal zirconium phosphate powder obtained by the preparation method according to the present invention may be provided as follows.

$K_{1.16}Zr_{1.92}Hf_{0.04}(PO_4)_3$
$KZr_{1.96}Hf_{0.04}(PO_4)_3$
$K_{1.08}Zr_{1.86}Hf_{0.12}(PO_4)_3$
$K_{0.82}H_{0.34}Zr_{1.92}Hf_{0.04}(PO_4)_3$
$K_{0.6}H_{0.3}Zr_{2.0}Hf_{0.025}(PO_4)_3 \cdot 0.1H_2O$
$Na_{0.72}K_{0.28}Zr_{1.88}Hf_{0.12}(PO_4)_3 \cdot 0.2H_2O$
$Na_{0.3}K_{0.4}H_{0.24}Zr_{2.0}Hf_{0.015}(PO_4)_3 \cdot 0.1H_2O$
$Na_{1.2}Zr_{1.93}Hf_{0.02}(PO_4)_3 \cdot 0.1H_2O$
$H_{1.2}Zr_{1.88}Hf_{0.07}(PO_4)_3 \cdot 0.11H_2O$
$H_{0.92}Zr_{1.95}Hf_{0.07}(PO_4)_3 \cdot 0.11H_2O$ Uses The low thermal expansion filler of the present invention may be suitably used for a sealing glass useful as a sealing material for a electric component such as a highly reliable package provided with a device such as a cathode ray tube, a plasma display panel, a fluorescent display tube, a field-emission display (FED), a semiconductor integrated circuit, a quartz vibrator, and a surface acoustic wave (SAW) filter. A mixture of a sealing glass and a vehicle may be also used as a paste composition.

A use form of the low thermal expansion filler of the present invention is not limited particularly and may be suitably mixed or compounded with other components according to the intended application. Examples of the form include a variety of forms including a powder, a powder-containing dispersion, a powder-containing particle, a powder-containing coating, a powder-containing fiber, a powder-containing plastic, a powder-containing film and the like and the filler may be suitably used for materials requiring control of thermal expansion. The low thermal expansion filler of the present invention may be mixed with another low-temperature controlling filler to control processability or thermal expansion, if necessary. Specific examples thereof include low thermal expansion fillers such as cordierite, β spodumene, β eucryptite, lead titanate, aluminum titanate, mullite, zircon, silica, celsian, willemite and alumina.

Preferred uses of the low thermal expansion filler of the present invention may include a sealing glass useful as a sealing material for a electric component such as a highly reliable package provided with a device such as a cathode ray tube, a plasma display panel, a fluorescent display tube, a FED, a semiconductor integrated circuit, a quartz vibrator, and a SAW filter.

A sealing glass for air-tightly sealing a electrical component such as a cathode ray tube, a plasma display panel, a fluorescent display tube and the like preferably perform sealing at a low temperature as possible to not have negative effects on sealed materials. For this reason, a sealing material containing a low-melting point glass containing lead as a constituent component has been widely used. However, recently, there is a need for developing a sealing material containing no lead due to environmental problems and the like.

Meanwhile, since the low-melting point glass used as a main component for these sealing glasses has a higher thermal expansion than that of the glass to be sealed, thermal expansion is generally adjusted by adding a low thermal expansion filler. However, non-lead glasses such as phosphate glass or bismuth glass containing no lead have high thermal expansion, as compared to conventional lead glasses, addition of conventional low thermal expansion fillers had problems of damage to flowability such as the difficulty of controlling a coefficient of thermal expansion of a sealing material to a predetermined level.

A preferred application of glass composition of the present invention is a sealing glass and the sealing glass is composed of a mixture of a low-melting point glass and a low thermal expansion filler. A main component of the low-melting point glass powder may use a known composition. For example, the glass composition may be selected from the following examples, and a non-lead glass composition is preferable in view of environmental effects.

.$Bi_2O_3$ (50 to 85%)—ZnO (10 to 25%)—$Al_2O_3$(0.1 to 5%)—$B_2O_3$(2 to 20%)—MO (0.2 to 20%, M is an alkaline earth metal)

.SnO (30 to 70%)—ZnO (0 to 20%)—$Al_2O_3$(0 to 10%)—$B_2O_3$ (0 to 30%)—$P_2O_5$ (5 to 45%)

.PbO (70 to 85%)—ZnO (7 to 12%)—$SiO_2$ (0.5 to 3%)—$B_2O_3$ (7 to 10%)—BaO (0 to 3%)

.$V_2O_5$ (28 to 56%)—ZnO (0 to 40%)—$P_2O_5$ (20 to 40%)—BaO (7 to 42%)

$V_2O_5$ (25 to 50%)—BaO (5 to 30%)—$TeO_2$ (20 to 40%)—$WO_2$ (1 to 25%)—$P_2O_5$ (0 to 20%)

.$Bi_2O_3$ (55 to 85%)—$B_2O_3$ (5 to 20%)—ZnO (1 to 15%)—$SiO_2$ (0 to 7%)

.$B_2O_3$ (38 to 45%)—ZnO (2 to 10%)—$SiO_2$ (30 to 36%)—$Al_2O_3$ (0.1 to 10%)—$Li_2O$ (0 to 10%)—$Na_2O$ (0 to 10%)—$K_2O$ (0 to 10%)

A method for preparing glass composition by mixing the low thermal expansion filler of the present invention with the sealing glass may be any one of known methods. Examples of the method include directly mixing a glass powder with a low thermal expansion filler using a mixer; incorporating a low thermal expansion filler in a case of pulverizing an aggregated glass and simultaneously pulverizing and mixing the filler; and separately adding and mixing a glass powder and a low thermal expansion filler to a paste material such as vehicle.

The mix ratio of a low thermal expansion filler in the glass composition made of a low-melting point glass and a low thermal expansion filler is preferably 5 to 40%, and is more preferably 10 to 35%. When the mix ratio of low thermal expansion filler is lower than 5%, the control of thermal expansion is insufficient and when the mix ratio t of the low thermal expansion filler is 40% or more, sealing is difficult. The glass composition of the present invention is mixed with a vehicle to prepare a paste composition and the paste composition may be used for a sealing glass. The vehicle is an additive to facilitate handling of a powder-form glass composition in the form of a semiflowable paste and is composed of 0.5 to 2% by mass of nitrocellulose as a solute, and 98 to 99.5% by mass of isoamyl acetate or butyl acetate as a solvent.

The low thermal expansion filler of the present invention has a particle size in which fine or large particles are controlled to a low level, as compared to low thermal expansion fillers composed of hexagonal zirconium phosphates obtained by conventional wet, hydrothermal and calcination methods and the like, and thus exhibits superior dispersibility when mixed with a glass powder and flowability during heat-melting and is excellent in controlling a low thermal expansion property. In addition, the filler is suitable for use as a low thermal expansion filler which is added to a glass powder used for a electrical component of, in particular, a cathode ray tube, a plasma display panel (PDP), a fluorescent display tube, a LSI package and the like.

EXAMPLES

Hereinafter, the present invention will be described with reference to examples and is not limited thereto.

Purity is measured by a fluorescent X-ray analyzer and means % by weight of a component derived from hexagonal zirconium phosphate of detected components.

The peak intensity (cps) at about $2\theta=20.2°$ measured with X-rays by powder X-ray diffraction was measured from heights of diffraction peaks after the background was reduced using a powder X-ray diffraction analyzer using the copper target X-ray pipe as an irradiation source and using CuKa rays under the conditions of 50 kv/120 mA.

The median diameter and particle size distribution were analyzed on a volume basis using a laser diffraction particle size distribution meter.

Example 1

Synthesis 1 of K-type Hexagonal Zirconium Phosphate 0.67 moles of zirconium basic carbonate ($3ZrO_2.CO_2.xH_2O$) containing 2.1% hafnium wherein a median particle size thereof was 18 μm and particles with a particle size of 0.8 μm to 50 μm were present at 100% on a volume basis with respect to the total particles were suspended in 300 ml of deionized water and 0.27 moles of phosphoric acid were added thereto with stirring. A 20% aqueous solution containing 0.07 moles of potassium hydroxide was further added thereto, followed by heating and aging for 2 hours at 98° C. Then, the resulting solid was sufficiently washed and dried at 120° C. After drying, the resulting solution was heated using an electric furnace at 1,300° C. for 8 hours to synthesize a hexagonal zirconium phosphate powder. This hexagonal zirconium phosphate could be easily pulverized and was identified as hexagonal zirconium phosphate by powder X-ray diffraction. The measurement results of purity by fluorescence X-ray diffraction, peak intensity (cps) at about $2\theta=20.2°$ by powder X-ray diffraction, median particle size, the content of particles with a size of 0.8 μm to 50 μm on a volume basis are shown in Table 1.

Example 2

Synthesis of Na-Type Hexagonal Zirconium Phosphate 0.67 moles of zirconium basic carbonate ($3ZrO_2.CO_2.xH_2O$) containing 2.1% hafnium wherein a median particle size thereof was 18 μm and particles with a particle size of 0.8 μm to 50 μm were present at 100% on a volume basis of the total particles were suspended in 300 ml of deionized water and 0.27 moles of phosphoric acid were added thereto with stirring. A 20% aqueous solution containing 0.07 moles of sodium hydroxide was further added thereto, followed by heating and aging for 2 hours at 98° C. Then, the resulting solid was sufficiently washed and dried at 120° C. After drying, the resulting solution was heated using an electric furnace at 1,300° C. for 8 hours to synthesize a hexagonal zirconium phosphate powder. This hexagonal zirconium phosphate could be easily pulverized and was identified as hexagonal zirconium phosphate by powder X-ray diffraction. The measurement results of purity by fluorescence X-ray diffraction, peak intensity (cps) at about $2\theta=20.2°$ by powder X-ray diffraction, median particle size, the content of particles with a size of 0.8 μm to 50 μm on a volume basis are shown in Table 1.

Example 3

Synthesis 2 of K-Type Hexagonal Zirconium Phosphate 0.1 moles of zirconium carbonate hydroxide oxide ($2ZrO_2.CO_2.xH_2O$) containing 2.1% hafnium wherein a median particle size thereof was 8 μm and particles with a particle size of 0.8 μm to 50 μm were present at 100% on a volume basis of the total particles was suspended in 300 ml of deionized water and 0.27 moles of phosphoric acid was added thereto with stirring. A 20% aqueous solution containing 0.07 moles of potassium hydroxide was further added thereto, followed by heating and aging for 2 hours at 98° C. Then, the resulting solid was sufficiently washed and dried at 120° C. After drying, the resulting solution was heated using an electric furnace at 1,250° C. for 8 hours to synthesize a hexagonal zirconium phosphate powder. This hexagonal zirconium phosphate could be easily pulverized and was identified as hexagonal zirconium phosphate by powder X-ray diffraction. The measurement results of purity by fluorescence X-ray diffraction, peak intensity (cps) at about $2\theta=20.2°$ by powder X-ray diffraction, median particle size, the content of particles with a size of 0.8 μm to 50 μm on a volume basis are shown in Table 1.

Example 4

Synthesis 3 of K-Type Hexagonal Zirconium Phosphate 100 g of sodium chloride was dissolved in 300 ml of deionized water, 0.055 moles of sodium carbonate and 0.11 moles of sodium hydrogen carbonate were added thereto, and a 20% aqueous solution containing 0.1 moles of zirconium oxychloride containing 2.1% hafnium was added thereto. A water temperature was elevated to 90° C. for about 30 minutes and aged at 90° C. for 2 hours to synthesize zirconium basic carbonate. A solid of the aqueous solution was filtered, washed until the electrical conductivity of the filtrate reached 300 μS and was dispersed in 300 ml of deionized water. 0.13 moles of phosphoric acid was added while stirring the dispersion. A 20% aqueous solution containing 0.07 moles of potassium hydroxide was further added thereto, followed by heating to 98° C. and aging at 98° C. for 2 hours. Then, the resulting solid was sufficiently washed until the electrical conductivity of the resulting solid reached about 300 μS, and dried at 120° C. After drying, the resulting solid was heated using an electric furnace at 1,350° C. for 8 hours to synthesize a hexagonal zirconium phosphate powder. This hexagonal zirconium phosphate could be easily pulverized and was identified as hexagonal zirconium phosphate by powder X-ray diffraction. The measurement results of purity by fluorescence X-ray diffraction, peak intensity (cps) at about $2\theta=20.2°$ by powder X-ray diffraction, median particle size, the content of particles with a size of 0.8 μm to 50 μm on a volume basis are shown in Table 1.

Example 5

Synthesis 4 of K-Type Hexagonal Zirconium Phosphate 0.2 moles of zirconium dicarbonate ($ZrO_2.CO_2.xH_2O$) containing 1.8% hafnium wherein a median particle size thereof was 12 μm and particles with a particle size of 0.8 μm to 50 μm were present at 99.1% on a volume basis of the total particles was suspended in 300 ml of deionized water and 0.28 moles of phosphoric acid was added thereto with stirring. A 20% aqueous solution containing 0.09 moles of potassium hydroxide was further added thereto, followed by heating to 98° C. and aging for 2 hours at 98° C. Then, the resulting solid was sufficiently washed and dried at 120° C. After drying, the resulting solution was heated using an electric furnace at 1,100° C. for 8 hours to synthesize hexagonal zirconium phosphate. This hexagonal zirconium phosphate could be easily pulverized and was identified as hexagonal zirconium phosphate by powder X-ray diffraction. The measurement results of purity by fluorescence X-ray diffraction, peak intensity (cps) at about $2\theta=20.2°$ by powder X-ray diffraction, median particle size, the content of particles with a size of 0.8 μm to 50 μm on a volume basis are shown in Table 1.

Comparative Example 1

Synthesis of Hexagonal Zirconium Phosphate Using Water-Soluble Zr Raw Material 0.2 moles of zirconium oxychloride containing 1.6% hafnium was dissolved in 300 ml of deionized water and 0.3 moles of phosphoric acid was further added thereto with stirring. A 20% aqueous solution containing 0.1 moles of potassium hydroxide was further added thereto, followed by heating to 98° C. and aging for 2 hours. Then, the resulting solid was sufficiently washed and dried at 120° C. After drying, the resulting solid was heated using an electric furnace at 1,100° C. for 8 hours to synthesize hexagonal zirconium phosphate. The hexagonal zirconium phosphate was hard, and was thus pulverized using a ball mill for 24 hours, and was identified as hexagonal zirconium phosphate by powder X-ray diffraction. Regarding the hexagonal zirconium phosphate, the measurement results of purity by fluorescence X-ray diffraction, peak intensity (cps) at about $2\theta=20.2°$ by powder X-ray diffraction, median particle size, the content of particles with a size of 0.8 μm to 50 μm on a volume basis are shown in Table 1.

Comparative Example 2

Wet-Synthesis of Hexagonal Zirconium Phosphate Using Water-Soluble Zr Raw Material 0.1 moles of oxalic acid and 0.2 moles of zirconium oxychloride containing 1.6% hafnium were dissolved in 300 ml of deionized water and 0.3 moles of phosphoric acid was further added thereto with stirring. A 20% aqueous solution containing 0.1 moles of potassium hydroxide was further added thereto, followed by heating to 98° C. and aging for 4 hours. Then, the resulting solid was sufficiently washed and dried at 120° C. to synthesize hexagonal zirconium phosphate. The hexagonal zirconium phosphate could be readily pulverized and was identified as hexagonal zirconium phosphate by powder X-ray diffraction. The measurement results of purity by fluorescence X-ray diffraction, peak intensity (cps) at about 2θ=20.2° by powder X-ray diffraction, median particle size, the content of particles with a size of 0.8 μm to 50 μm on a volume basis are shown in Table 1.

Comparative Example 3

Synthesis of Hexagonal Zirconium Phosphate by Calcination 0.2 moles of zirconium oxide containing 1.6% hafnium, 0.3 moles of ammonium dihydrogen phosphate and 0.1 moles of potassium carbonate were mixed using a ball mill and then calcinated in a stepwise manner using an electric furnace at 200° C. for 4 hours, 900° C. for 4 hours and 1,400° C. for 4 hours, thereby synthesizing hexagonal zirconium phosphate. The hexagonal zirconium phosphate was hard, and was thus pulverized using a ball mill for 24 hours, and was identified as hexagonal zirconium phosphate by powder X-ray diffraction. Regarding the hexagonal zirconium phosphate, the measurement results of purity by fluorescence X-ray diffraction, peak intensity (cps) at about 2θ=20.2° by powder X-ray diffraction, median particle size, the content of particles with a size of 0.8 μm to 50 μm on a volume basis are shown in Table 1.

Comparative Example 4

Synthesis of K-Type Hexagonal Zirconium Phosphate 0.67 moles of zirconium basic carbonate ($3ZrO_2.CO_2.xH_2O$) containing 2.1% hafnium wherein a median particle size thereof was 18 μm and particles with a particle size of 0.8 μm to 50 μm were present at 100% on a volume basis of the total particles were suspended in 300 ml of deionized water, and 0.1 moles of oxalic acid and 0.27 moles of phosphoric acid were added thereto with stirring. A 20% aqueous solution containing 0.07 moles of potassium hydroxide was further added thereto, followed by heating and aging for 2 hours at 98° C. Then, the resulting solid was sufficiently washed and dried at 120° C. After drying, the resulting solution was heated using an electric furnace at 1,300° C. for 8 hours to synthesize hexagonal zirconium phosphate. This hexagonal zirconium phosphate could be easily pulverized and was identified as hexagonal zirconium phosphate by powder X-ray diffraction. The measurement results of purity by fluorescence X-ray diffraction, peak intensity (cps) at about 2θ=20.2° by powder X-ray diffraction, median particle size, the content of particles with a size of 0.8 μm to 50 μm on a volume basis are shown in Table 1.

Comparative Example 5

A mean particle diameter of cordierite powders used for commercially available low thermal expansion fillers was measured and the results are shown in Table 1.

Example 6

Synthesis 5 of K-Type Hexagonal Zirconium Phosphate 0.67 moles of zirconium basic carbonate ($3ZrO_2.CO_2.xH_2O$) containing 2.1% hafnium composed of particles wherein a median particle size thereof was 18 μm and particles with a particle size of 0.8 μm to 50 μm were present at 100% on a volume basis of the total particles were suspended in 300 ml of deionized water, and 0.27 moles of phosphoric acid were added thereto with stirring. A 20% aqueous solution containing 0.07 moles of potassium hydroxide was further added thereto, followed by heating and aging for 2 hours at 98° C. Then, the resulting solid was sufficiently washed with deionized water in a ceramic filter washing machine until an electric conductivity of the filtrate reached 300 μS or less and the solid was taken out and dried at 120° C. for 3 hours.

After drying, the resulting solid was heated using an electric furnace at 1,300° C. for 8 hours to synthesize a hexagonal zirconium phosphate powder. This hexagonal zirconium phosphate could be easily pulverized in a mortar, and was identified as hexagonal zirconium phosphate by powder X-ray diffraction. The measurement results of purity by fluorescence X-ray diffraction, peak intensity (cps) at about 2θ=20.2° by powder X-ray diffraction, median particle size, the content of particles with a size of 0.8 μm to 50 μm on a volume basis are shown in Table 1.

Example 7

Synthesis 6 of K-Type Hexagonal Zirconium Phosphate 0.67 moles of zirconium basic carbonate ($3ZrO_2.CO_2.xH_2O$) containing 2.1% hafnium wherein a median particle size thereof was 18 μm and particles with a particle size of 0.8 μm to 50 μm were present at 100% on a volume basis of the total particles were suspended in 300 ml of deionized water, and 0.27 moles of phosphoric acid were added thereto with stirring. A 20% aqueous solution containing 0.07 moles of potassium hydroxide was further added thereto, followed by heating and aging for 2 hours at 98° C. Then, the resulting solid was not washed and the solid was taken out and dried at 120° C. for 3 hours.

After drying, the resulting solid was heated using an electric furnace at 1,300° C. for 8 hours to synthesize a hexagonal zirconium phosphate powder. This hexagonal zirconium phosphate could not be easily pulverized, but was thoroughly pulverized in a mortar using a pulverizing apparatus. The hexagonal zirconium phosphate was identified by powder X-ray diffraction. The measurement results of purity by fluorescence X-ray diffraction, peak intensity (cps) at about 2θ=20.2° by powder X-ray diffraction, median particle size, the content of particles with a size of 0.8 μm to 50 μm on a volume basis are shown in Table 1.

TABLE 1

| | Purity (%) | Peak intensity at 2θ = 20.2° (cps) | Median particle size (μm) | Content of 0.8 μm to 50 μm particles (%) |
|---|---|---|---|---|
| Ex. 1 | 99.9 | 5800 | 21 | 100 |
| Ex. 2 | 99.9 | 6200 | 23 | 100 |
| Ex. 3 | 99.9 | 6300 | 10 | 100 |
| Ex. 4 | 99.8 | 6100 | 2.3 | 96 |
| Ex. 5 | 99.9 | 6900 | 14 | 100 |
| Ex. 6 | 99.9 | 5800 | 21 | 100 |
| Ex. 7 | 95.4 | 5000 | 28 | 95 |
| Comp. Ex. 1 | 96.8 | 4800 | 13 | 88 |
| Comp. Ex. 2 | 99.9 | 5200 | 0.7 | 43 |
| Comp. Ex. 3 | 96.2 | 5000 | 2.4 | 78 |
| Comp. Ex. 4 | 99.1 | 5100 | 8 | 90 |
| Comp. Ex. 5 | — | — | 10 | 100 |

As is clear from Table 1, the low thermal expansion filler of the present invention has excellent purity and crystallinity, and has a particle size adjusted to a preferred coarse size range. Meanwhile, Comparative Examples 1 to 4 are the same hexagonal zirconium phosphate powders as that of the present invention, but one or more of the purity, crystallinity or particle size thereof could not be adjusted to a preferred range.

Example 8

Evaluation of Glass Composition

The low thermal expansion filler obtained in Example 1 was mixed with a low-melting point phosphate-based glass powder ($SnO—P_2O_5—ZnO—Al_2O_3—B_2O_3$) at a weight ratio of 75:25, and the mixture was molded into a cylindrical shape having a diameter of 15 mm and a height of 5 mm to prepare a molded material a. The molded material a was placed on a plate glass and was maintained in an electric furnace at 550° C. for 10 minutes to perform calcination. The diameter of molded material a varied by the calcination was measured and the resulting flow diameter is shown in Table 2. The surface of molded material a, the flow diameter of which was measured was planarized, and a coefficient of thermal expansion thereof was measured at a temperature elevating rate of 10° C./min at 100° C. to 300° C. using a thermal mechanical analyzer, TMA2940 manufactured by TA instrument Co., Ltd. The results thus obtained are shown in Table 2.

In the same manner, molded glasses b to j were prepared using the low thermal expansion fillers prepared in Examples 2 to 5 and the low thermal expansion filler prepared in Comparative Examples 1 to 5. In addition, a molded material k was molded in the same manner without using a filler. Flowability and coefficient of thermal expansion of the molded materials thus prepared were measured and the results are shown in Table 2.

TABLE 2

| | Flow diameter (mm) | Coefficient of thermal expansion (/° C.) |
|---|---|---|
| Molded material a (Ex. 1) | 28 | $109 \times 10^{-7}$ |
| Molded material b (Ex. 2) | 28 | $127 \times 10^{-7}$ |
| Molded material c (Ex. 3) | 27 | $125 \times 10^{-7}$ |
| Molded material d (Ex. 4) | 26 | $128 \times 10^{-7}$ |
| Molded material e (Ex. 5) | 25 | $119 \times 10^{-7}$ |
| Molded material f (Comp. Ex. 1) | 23 | $142 \times 10^{-7}$ |
| Molded material g (Comp. Ex. 2) | 20 | $138 \times 10^{-7}$ |
| Molded material h (Comp. Ex. 3) | 23 | $136 \times 10^{-7}$ |
| Molded material i (Comp. Ex. 4) | 22 | $148 \times 10^{-7}$ |
| Molded material j (Comp. Ex. 5) | 18 | $146 \times 10^{-7}$ |
| Molded material k (additive-free) | 28 | $170 \times 10^{-7}$ |

As is clear from Table 2, a molded glass using the low thermal expansion filler of the present invention has excellent flowability and thermal expansion property, satisfies the physical properties required for a sealing glass, and exhibits superior.

INDUSTRIAL APPLICABILITY

The present invention provides a low thermal expansion filler containing a hexagonal zirconium phosphate powder which has a specific particle size and thus exhibits high crystallinity. The low thermal expansion filler of the present invention exhibits controlled thermal expansion property and superior processability when applied to low melting point glasses and the like and are thus used as a sealing glass for a electric component such as a cathode ray tube, a PDP and a fluorescent display tube.

What is claimed is:

1. A method for preparing a low thermal expansion filler, comprising:
   dispersing a zirconium carbonate powder containing hafnium in an aqueous solution containing at least one ion selected from an alkali metal ion, an alkaline earth metal ion and an ammonium ion, and a phosphate ion; and
   aging the dispersion while wet-heating; and
   subsequently dry-heating the dispersion to give a low thermal expansion filler,
   wherein the low thermal expansion filler comprising a hexagonal zirconium phosphate powder represented by Formula (1) below, wherein a particle size of 0.8 μm to 50 μm is 95% or more on a volume basis with respect to the total particles, $$M_aZr_bHf_c(PO_4)_3 \cdot nH_2O \qquad (1)$$

wherein M represents at least one ion selected from the group consisting of an alkali metal ion, an alkaline earth metal ion, an ammonium ion and a hydrogen ion; a, b and c are values satisfying 1.75<b+c<2.25, and a+4(b+c)=9, in a case where M is monovalent, 2a+4(b+c)=9 in a case where M is divalent; a and b are each a positive number, c is a positive number, and n is zero or a positive number of 2 or less.

2. The method according to claim 1, wherein 95% or more of particles of the zirconium carbonate powder on a volume basis with respect to the total particles of the zirconium carbonate powder has a particle size of 0.5 μm to 50 μm.

3. The method according to claim 1, wherein the method comprises:
   dispersing the zirconium carbonate powder containing hafnium in an aqueous solution containing at least one ion selected from the group consisting of an alkali metal ion, an alkaline earth metal ion and an ammonium ion, and a phosphate ion, and aging the dispersion while wet-heating;
   washing particles with deionized water at a subsequent stage; and
   dry-heating the particles at a further subsequent stage, in this order.

4. A method for preparing a glass composition comprising:
   dispersing a zirconium carbonate powder containing hafnium in an aqueous solution containing at least one ion selected from an alkali metal ion, an alkaline earth metal ion and an ammonium ion, and a phosphate ion;
   aging the dispersion while wet-heating to give a low thermal expansion filler; and
   mixing a glass powder and the low thermal expansion filler;
   wherein the low thermal expansion filler comprises a hexagonal zirconium phosphate powder represented by Formula (1) below, wherein a particle size of 0.8 μm to 50 μm is 95% or more on a volume basis with respect to the total particles, $$M_aZr_bHf_c(PO_4)_3 \cdot nH_2O \qquad (1)$$

wherein M represents at least one ion selected from the group consisting of an alkali metal ion, an alkaline earth metal ion, an ammonium ion and a hydrogen ion; a, b and c are values satisfying 1.75<b+c<2.25, and a+4(b+c)=9, in a case where M is monovalent, 2a+4(b+c)=9 in a case where M is divalent; a and b are each a positive number, c is a positive number, and n is zero or a positive number of 2 or less.

5. The method for preparing a glass composition according to claim 4, wherein the glass powder is non-lead glass powder having a melting point of 700° C. or less.

6. A method for preparing a low thermal expansion filler, comprising:
dispersing a zirconium carbonate powder containing hafnium in an aqueous solution containing at least one ion selected from an alkali metal ion, an alkaline earth metal ion and an ammonium ion, and a phosphate ion; and
aging the dispersion while wet-heating to give a low thermal expansion filler,
wherein the low thermal expansion filler comprising a hexagonal zirconium phosphate powder represented by Formula (1) below, wherein a particle size of 0.8 μm to 50 μm is 95% or more on a volume basis with respect to the total particles, $$M_a Zr_b Hf_c (PO_4)_3 \cdot nH_2O \tag{1}$$

wherein M represents at least one ion selected from the group consisting of an alkali metal ion, an alkaline earth metal ion, an ammonium ion and a hydrogen ion; a, b and c are values satisfying $1.75<b+c<2.25$, and $a+4(b+c)=9$, in a case where M is monovalent, $2a+4(b+c)=9$ in a case where M is divalent; a and b are each a positive number, c is a positive number, and n is zero or a positive number of 2 or less.

7. The method of claim 6, wherein hafnium is present at 0.2% by mass to 5% by mass based on the total mass of the zirconium carbonate powder.

\* \* \* \* \*